Feb. 21, 1956 P. BROWN Re. 24,120

PACKAGING MATERIAL

Original Filed Nov. 3, 1951

INVENTOR
PAUL BROWN
BY
Connil, Edmonds, Morton, Barrows and Taylor
HIS ATTORNEYS United States Patent Office Re. 24,120
Reissued Feb. 21, 1956

24,120

PACKAGING MATERIAL

Paul Brown, New York, N. Y., assignor to Packaging Materials Corp., Providence, R. I., a corporation of Rhode Island Original No. 2,704,268, dated March 15, 1955, Serial No. 254,692, November 3, 1951. Application for reissue August 25, 1955, Serial No. 530,655

4 Claims. (Cl. 154—55)

Matter enclosed in heavy brackets [ ] appears in the original patent but forms no part of this reissue specification; matter printed in italics indicates the additions made by reissue.

This invention relates to improvements in corrugated board for use in the manufacture of packing cases of the character commonly employed for the shipment of heavy articles such as filled or empty cans, beverage bottles, soap, etc. Cases of this type are commonly formed of double-faced corrugated board, such board being customarily made with facing sheets of so-called kraft paper which comprises 100% new pulp. Kraft paper is consequently much more expensive than paper and paper board [is] made in whole or in part from waste paper, but in order to have the strength and rigidity required for shipping cases it is necessary at present that the corrugated board used for such cases be made mostly of kraft paper.

Heavy fiber board is to some extent used in lieu of double-faced corrugated board for making packing cases. Fiber board is made in part of pulp from waste paper, but fiber board of the necessary strength and rigidity required for packing cases must be of such thickness that the cost of the fiber board is greater than corrugated board of the same strength and rigidity, and furthermore is heavier and consequently adds to the shipping cost.

The object of my invention is to provide a paper board for shipping cases which contains a greater percentage of board made from waste paper pulp which possesses equal or greater strength and rigidity than the conventional double-faced corrugated board but which weighs no more than such board and may be produced at considerably less cost.

A further object of my invention is to provide a new type of corrugated paper board which has remarkable strength and rigidity and is eminently suited for making either single or double faced corrugated board, the one for manufacturing small light boxes and the other for heavy shipping cases.

My improved paper board is a corrugated board, but the board is produced in corrugated form directly from the pulp and is then treated and backed with a suitable sheet of backing material in a manner to greatly increase the stiffness and strength of the corrugated portions of the board and at the same time provide a smooth, strong sheet to serve as the outside of the case, while the inside surface of the case is formed of the untreated molded pulp which has a cushioning action greatly in excess of the hard kraft paper from which the corrugated board used for the manufacture of shipping cases is made. Such single faced board can be used to make boxes heretofore made of double faced corrugated board which weighs more and, in most instances, contains a smaller percentage of waste materials than the new board.

Where greater strength is required, as in the manufacture of shipping cases for heavy articles, backing sheets may be applied to both faces of the board, with the result that a corrugated board is produced, the strength of which is equal to that of test corrugated board but is lighter in weight and contains a greater percentage of waste paper pulp.

In the accompanying drawings I have illustrated my improved board and also the successive steps employed in its manufacture.

Referring to said drawings.

Figure 1:
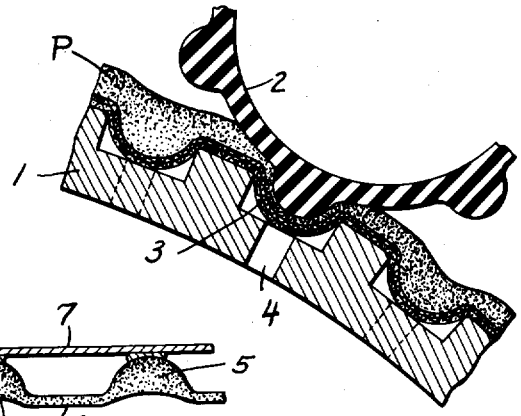
Fig. 1 is a diagrammatic sectional view of a portion of the cylinder of a pulp molding machine which may be used to form the corrugated sheet of my improved paper board.

Referring to the drawings, 1 indicates a portion of the wall of the cylinder of a pulp molding machine used for forming the corrugated sheet used in making my improved board. The machine is of the type shown in Perry Patent No. 2,221,200 and also in my copending application for Corrugated Paper Machine filed of even date herewith. It consists essentially of a ribbed cylinder covered with corrugated screening 3. Holes 4 extend through the wall of the cylinder along the bottom of the grooves between the ribs, and a suction box, not here shown, is arranged within the interior of the cylinder to draw the pulp down into the grooves and extract a considerable portion of the water from the pulp.

By flowing onto the cylinder 1 a thinner layer of pulp than is shown in Fig. 1 a comparatively soft corrugated sheet will be produced when removed from the cylinder in this form and dried. The entire board is soft and flexible like that described in Perry Patent No. 2,209,537 and forms a very excellent packing material for frangible articles.

To make the board of the present invention, I provide at a point in the movement of the cylinder the fluted pressure roll 2 which is preferably positively driven at the same peripheral speed as the cylinder. The fluted pressure roll 2 may be formed of fiber, hard rubber, metal or any suitable material, and as shown is provided with longitudinal ribs shaped to constitute a replica of the corrugations in the screening 3. The cylinder and the roll are spaced apart to leave between the surface of the cylinder grooves and ribs a distance corresponding to the desired thickness of the finished corrugated board. This distance may be varied by adjusting the roll toward and away from the surface of the cylinder.

Also I flow onto cylinder 1 a substantially thicker or deeper mass of pulp than described above, such thicker layer being shown at P in Fig. 1. When the sheet of wet pulp passes under the presser roller 2 the fiber in the grooves of the cylinder which form the ribs 5 of the corrugated sheet is compressed to a thickness comparable to the thickness of the connecting portions 6 of the web which form on the opposite side low ribs with broad flat tops separated by recesses 5a and which are not compressed to any substantial extent by the presser roller 2.

Figure 2:
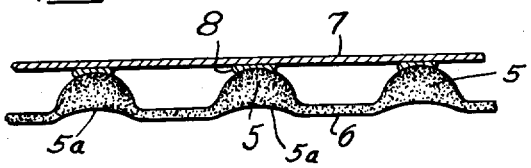
Fig. 2 is an enlarged cross sectional view of my improved paper board with a backing sheet attached.

The pulp is by nature quite resilient and as soon as it passes roller 2 springs back to a considerable extent as indicated at the right of roller 2 in Fig. 1. Hence the effect of roller 2 is not to produce highly compressed fiber in the ribs 5 of the corrugated sheet shown in Fig. 2 which is formed after drying the molded pulp in the ordinary manner, but the combined effect of flowing a thicker mass of pulp onto cylinder 1 and the use of roller 2, is to put more fiber into the ribs 5 between the outer surfaces of these ribs and the surfaces of recesses 5a than in the intervening low flat ribs 6, and render the structure of ribs 5 denser than those of ribs 6 and substantially increasing the strength and rigidity of the sheet. There being more fiber in the ribs than in the intervening portions the compressing effect of roller 2 is to render the fiber in the ribs 5 denser than in ribs 6. A similar effect is also obtained by flowing onto cylinder 1 a still thicker or deeper mass of pulp without the use of fluted pressure roller 2. The difference in the density of the fibers in the ribs and in the intermediate portions of the board will not be as great, however, as when roller 2 is used, and the percentage of moisture will be higher.

The molded corrugated sheet, thus formed has applied to its face, that is, across the denser ribs 5, a sheet 7 of hard kraft paper, (Fig. 2) the paper being attached to the crowns of the ribs by means of a cement such as sodium silicate which hardens on drying and serves to further stiffen the compressed fiber ribs forming the corrugations of the sheet. Any desired cement which hardens on setting may be employed in lieu of sodium silicate. By applying the backing sheet 7 to the crowns of the denser ribs 5 this sheet is placed at a maximum distance from the connecting portions or flat ribs 6 which are in general parallel with sheet 7, and maximum rigidity is thus imparted to the structure of the board. The silicate or other cement is applied to the crowns of the corrugations in sufficient quantity to cover a substantial portion of the crowns of the corrugations, as indicated at 8, so that on setting the crown portions of the corrugations are stiffened, thereby greatly increasing the strength of the board in the direction of the corrugations. This single backed product is useful in the manufacture of boxes for general use in place of ordinary corrugated boxes and can be substituted for conventional corrugated board boxes which weigh more and contain less waste material.

Figure 3:
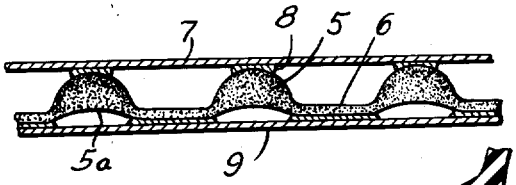
Fig. 3 is a similar view of a double-faced board.

Instead of applying the backing sheet to one face only of the board, which is desirable from the standpoint of economy and also to retain the cushioning effect of the molded corrugated board lining such boxes, I may add a second backing sheet 9 of kraft paper as illustrated in Fig. 3 to the opposite side of the corrugated sheet. The second backing sheet adds substantially to the strength of the board and if applied with a hardening cement which covers generally the entire area of the connecting portions 6 of the molded fiber sheet, the stiffness of the board will also be greatly increased.

My improved board is useful for making, packing or shipping cases for heavy articles such as soap, food products, beverages and the like. It is useful also for packing frangible and perishable articles which cannot be subjected to a stacking load, such, for example, as apples, lamp bulbs and the like. For such purposes the cartons are made with the ribs extending vertically of the carton, that is, in a direction transverse to the score lines of the flaps which form the ends of the cartons.

To form an extra strong packing case I may form the carton itself of double-faced board and then place within the carton a four-sided liner of single-faced board to thereby not only add to its capacity for carrying a stacking load, but also cushion the contents against damage from rough handling.

Figure 4:
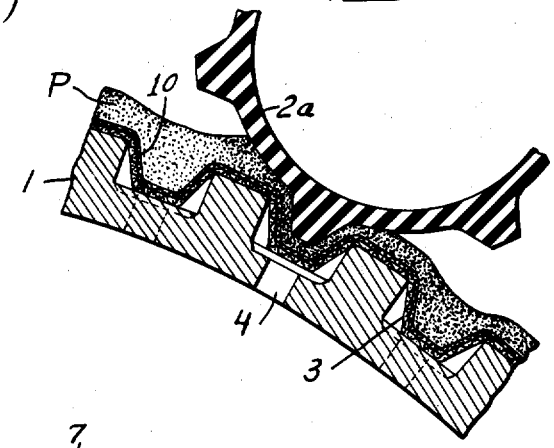
Fig. 4 is a diagrammatic view similar to Fig. 1 showing a modified form of cylinder.
Figure 5:
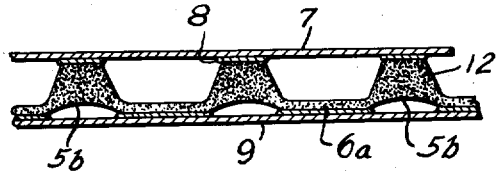
Fig. 5 is a sectional view of a modified form of double-faced board.

In Figs. 4 and 5 I have shown a modified board wherein the form of the corrugated sheet is shaped to provide a greater amount of pulp in the portions forming the ribs of the sheet and also provide a better bond between the ribs and the backing sheet attached thereto.

As shown in Fig. 4 the grooves in the wire mesh 3 covering the cylinder 1 are of trapezoidal configuration as shown at 10, while the ribs 11 of the presser roll 2a are of similar cross section. By this arrangement more pulp is taken up by the grooves of trapezoidal cross section than when the grooves are of semi-circular cross section, but without increasing the overall thickness of the sheet as measured from the outer face of the trapezoidal ribs 12 (Fig. 5) to the opposite face of the section 6a of the board between the ribs. A rib is formed which contains more pulp of substantially the same density as the ribs of the board shown in Fig. 2, but which is considerably stronger by virtue of its greater cross sectional area and also because it presents a flat outer face parallel with the plane of the sheet and against which the backing sheet is secured by an adhesive of the type referred to above.

When a sheet as above described is used in the manufacture of double-faced board as shown in Fig. 5, an unusually rigid board is formed which is particularly suitable for carrying a heavy stacking load.

Of course, the shape of the corrugations may be otherwise modified if desired, to impart different characteristics to the sheet, and one particular advantage of the process is that by molding the corrugated sheet in the manner described the amount of pulp in different portions of the board and the density of the pulp may be varied as desired. Another advantage of using a molded corrugated sheet is that a larger percentage of pulp recovered from waste paper and similar cheap grades of pulp may be used in making the shipping cases. Board made from recovered pulp by the processes customarily employed is not strong and breaks readily when folded of scored. However, when such pulp is compressed when wet, in the manner herein described, its strength is greatly increased and when used in conjunction with either one or two backing sheets of kraft paper the overall strength of the board is greater than the strength of conventional composite corrugated board of the same weight, and the cost of the new board is considerably less.

I claim:

1. As a new article of manufacture, a material of which to manufacture shipping cases comprising a molded corrugated sheet of felted pulp of waste paper having approximately flat strips of pressed felted pulp alternating with corrugations built up of felted pulp pressed to a substantially greater density than said strips, said flat strips lying substantially in a common plane extending approximately in line with the bases of the corrugations, the opposite face of the sheet having shallow recesses extending therein opposite said corrugations, and said flat strips being not substantially greater in width than the corrugations.

2. As a new article of manufacture, a material of which to manufacture shipping cases comprising a molded corrugated sheet of felted pulp of waste paper having approximately flat strips of pressed felted pulp alternating with corrugations built up of felted pulp pressed to a substantially greater density than said strips, said flat strips lying substantially in a common plane extending approximately in line with the bases of the corrugations, the opposite face of the sheet having shallow recesses extending therein opposite said corrugations, said flat strips being not substantially greater in width than the corrugations, and a reinforcing sheet of paper applied across the crowns of said corrugations and secured thereto by masses of adhesive covering a substantial portion of said crowns and enhancing the strength and rigidity of said material.

*3. As a new article of manufacture, a material of which to manufacture shipping cases comprising a molded corrugated sheet of felted fibrous pulp having approximately flat strips of pressed felted pulp alternating with corrugations built up of pressed felted pulp to a substantially greater thickness than said strips, said strips lying substantially in a common plane extending approximately in line with the bases of the corrugations, the opposite face of the sheet having shallow recesses extending therein opposite said corrugations, said flat strips*

*being not substantially greater in width than the corrugations, a reinforcing sheet of paper applied across the crowns of said corrugations and secured by adhesive, and a second reinforcing sheet of paper applied across said flat strips and secured thereto by adhesive.*

*4. As a new article of manufacture, a material of which to manufacture shipping cases comprising a molded corrugated sheet of felted fibrous pulp having approximately flat strips of pressed felted pulp alternating with corrugations built up of pressed felted pulp, said strips lying substantially in a common plane extending approximately in line with the bases of the corrugations, the opposite face of the sheet having shallow recesses extending therein opposite said corrugations, a reinforcing sheet of paper applied across the crowns of said corrugations and secured by adhesive, and a second reinforcing sheet of paper applied across said flat strips and secured thereto by adhesive, the said corrugations*

*having a thickness substantially greater than half the distance between the inner faces of said reinforcing sheets.*

References Cited in the file of this patent or the original patent

UNITED STATES PATENTS

| | | |
|---|---|---|
| 1,965,265 | Spohn | July 3, 1934 |
| 2,045,384 | Gerb | June 23, 1936 |
| 2,209,537 | Perry | July 30, 1940 |
| 2,261,730 | Mitman | Nov. 4, 1941 |
| 2,541,868 | Gordon | Feb. 13, 1951 |
| 2,568,349 | McKee | Sept. 18, 1951 |
| 2,626,429 | Merrill | Jan. 27, 1953 |

FOREIGN PATENTS

| | | |
|---|---|---|
| 100,392 | Australia | Feb. 25, 1937 |